United States Patent
Ishikawa

(10) Patent No.: US 7,884,876 B2
(45) Date of Patent: Feb. 8, 2011

(54) IMAGE-PICKUP APPARATUS, METHOD OF DETERMINING ATTACHMENT OF ACCESSORY DEVICE AND METHOD OF DISTINGUISHING ATTACHED ACCESSORY DEVICE

(75) Inventor: Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 11/778,246

(22) Filed: Jul. 16, 2007

(65) Prior Publication Data

US 2008/0024647 A1    Jan. 31, 2008

(30) Foreign Application Priority Data

Jul. 25, 2006    (JP)    .............................. 2006-201997

(51) Int. Cl.
  *H04N 5/232*    (2006.01)
  *G03B 5/02*    (2006.01)
(52) U.S. Cl. ........................ 348/345; 348/348; 348/349; 348/350; 348/353; 396/349
(58) Field of Classification Search ................ 348/345, 348/348, 349, 353, 350
See application file for complete search history.

(56) References Cited

U.S. PATENT DOCUMENTS

| 5,214,464 | A | * | 5/1993 | Karasaki et al. | ................ 396/92 |
| 5,347,340 | A | * | 9/1994 | Tsukada | ....................... 396/93 |
| 5,600,371 | A | * | 2/1997 | Arai et al. | .................... 348/335 |
| 7,098,954 | B2 | * | 8/2006 | Suda et al. | ................... 348/347 |
| 7,499,097 | B2 | * | 3/2009 | Onozawa | ..................... 348/348 |
| 2001/0038418 | A1 | * | 11/2001 | Suda et al. | ................... 348/347 |
| 2005/0110890 | A1 | * | 5/2005 | Sasaki et al. | ................. 348/345 |
| 2005/0117900 | A1 | * | 6/2005 | Ohmori et al. | .............. 396/448 |

\* cited by examiner

*Primary Examiner*—David L Ometz
*Assistant Examiner*—Quang V Le
(74) *Attorney, Agent, or Firm*—Cowan, Liebowitz & Latman, P.C.

(57) ABSTRACT

An image-pickup apparatus is disclosed onto which an accessory device is detachably attached and which is capable of recognizing that an output from a light-receiving sensor is influenced by an attachment of the accessory device. The image-pickup apparatus includes a first detector which is capable of outputting a signal corresponding to an object distance. The apparatus further includes a determining device which determines an attachment of the accessory device onto the image-pickup apparatus on the basis of a predetermined signal output from the first detector.

6 Claims, 8 Drawing Sheets

IMAGE-PICKUP APPARATUS, METHOD OF DETERMINING ATTACHMENT OF ACCESSORY DEVICE AND METHOD OF DISTINGUISHING ATTACHED ACCESSORY DEVICE

BACKGROUND OF THE INVENTION

The present invention relates to an image-pickup apparatus such as a video camera and a digital still camera.

Autofocus (AF) control methods for image-pickup apparatuses include a so-called TV-AF method which generates an AF evaluation value signal using high-frequency components (contrast components) extracted from an image (video) signal and searches for a focus lens position (in-focus position) where the AF evaluation value signal is at the maximum.

Further, a so-called hybrid AF method has been proposed in which the TV-AF method and an external ranging AF method or an internal phase difference AF method are combined (see Japanese Patent Laid-Open No. 2002-258147). The external ranging AF method measures a distance to an object to control a focus lens, and the internal phase difference AF method measures a defocus amount of an image-pickup optical system to control a focus lens.

The hybrid AF method moves the focus lens to the vicinity of the in-focus position using ranging information or phase difference information and then moves the focus lens therefrom by the TV-AF method, thereby achieving an in-focus state with high focusing accuracy in a short time.

In such a hybrid AF method using the external ranging AF method, a distance sensor is placed independently from the image-pickup optical system. The distance sensor has a high degree of freedom in layout in the image-pickup apparatus, which is advantageous to reduce the size of the image-pickup apparatus.

However, when an accessory device such as a conversion lens is attached to the image-pickup apparatus equipped with the distance sensor, light traveling from an object toward the distance sensor may be blocked by the accessory device. This makes an accurate calculation of the object distance with the distance sensor impossible.

In other words, a large difference is generated between an in-focus position according to the object distance acquired by the distance sensor and an accurate in-focus position acquired by the TV-AF method.

In such a situation, the focus lens is once moved to a position away from the accurate in-focus position, and then it is moved so as to search for the in-focus position by the TV-AF method.

This causes the image-pickup optical system to focus on an object other than the desired object or makes the time until achieving an in-focus state longer. In particular, the longer time until achieving an in-focus state causes a video camera to pick up an out-of-focus video for a longer time.

Therefore, it is necessary to cause the image-pickup apparatus to recognize whether or not an output from a light-receiving sensor used for the AF control, such as a distance sensor, is influenced by the attachment of the accessory device.

BRIEF SUMMARY OF THE INVENTION

The present invention provides an image-pickup apparatus onto which an accessory device is detachably attached and is capable of recognizing that an output from a light-receiving sensor is influenced by an attachment of the accessory device, a method of determining an attachment of an accessory device, and a method of distinguishing an attached accessory device.

According to an aspect, the present invention provides an image-pickup apparatus including a first detector which is capable of outputting a signal corresponding to an object distance, and a determining device which determines an attachment of the accessory device onto the image-pickup apparatus on the basis of a predetermined signal output from the first detector.

According to another aspect, the present invention provides an image-pickup apparatus including a first detector which is capable of outputting a signal corresponding to an object distance, and a distinguishing device which distinguishes an accessory device attached onto the image-pickup apparatus on the basis of a predetermined signal output from the first detector.

According to yet another aspect, the present invention provides a method of determining an attachment of an accessory device for an image-pickup apparatus, including the steps of activating a first detector which is capable of outputting a signal corresponding to an object distance, and determining the attachment of the accessory device onto the image-pickup apparatus on the basis of a predetermined signal output from the first detector.

According to further yet another aspect, the present invention provides a method of distinguishing an attached accessory device for an image-pickup apparatus, including the steps of activating a first detector which is capable of outputting a signal corresponding to an object distance, and distinguishing the accessory device attached onto the image-pickup apparatus on the basis of a predetermined signal output from the first detector.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the accompanying drawings.

Embodiment 1

Figure 1:
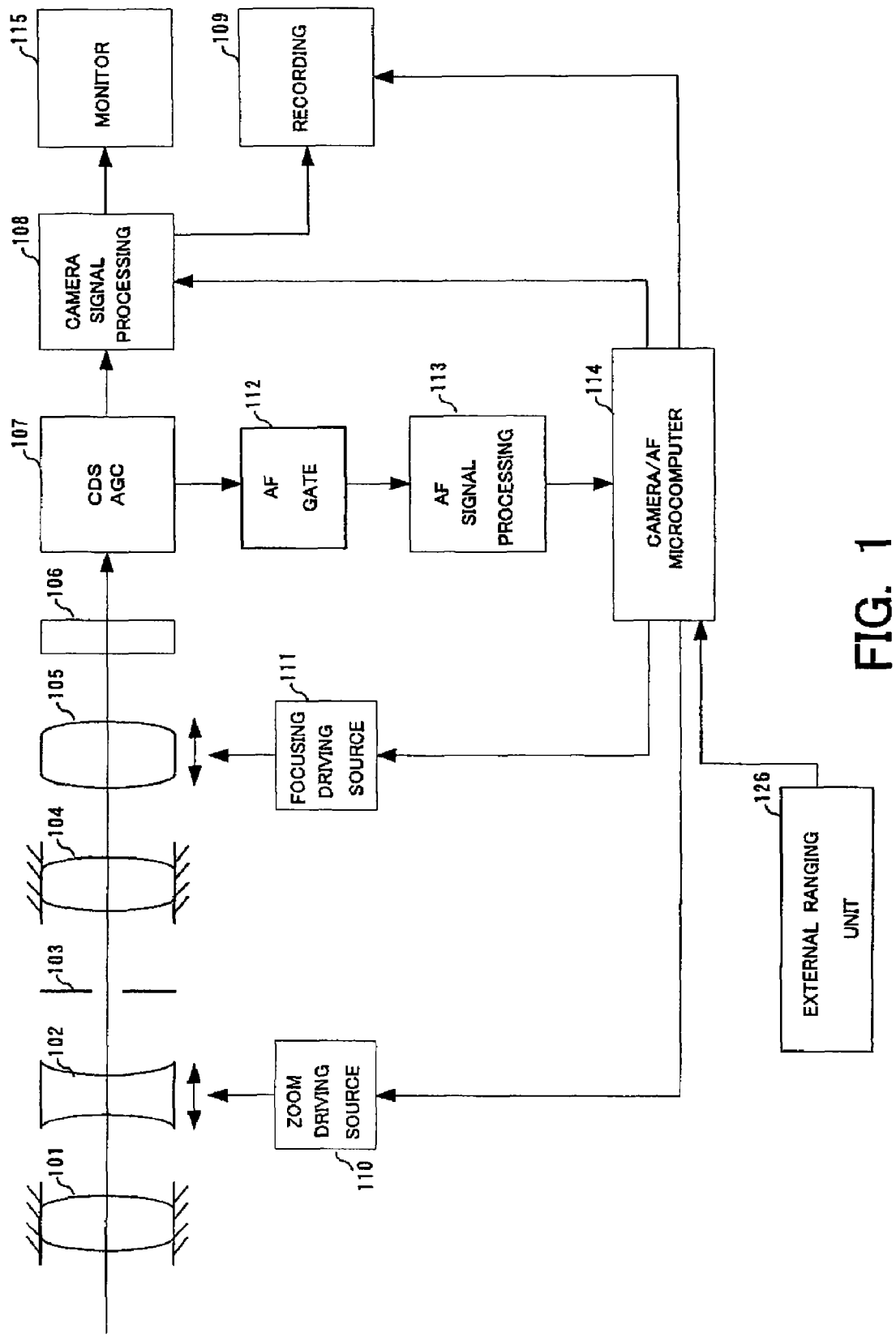
FIG. 1 is a block diagram showing the configuration of an image-pickup apparatus that is Embodiment 1 of the present invention.

FIG. 1 shows the configuration of an image-pickup apparatus such as a video camera and a digital still camera, which is Embodiment 1 of the present invention.

In FIG. 1, reference numeral 101 denotes a first fixed lens, 102 a zoom lens which moves in an optical axis direction to vary the magnification, and 103 a stop.

Reference numeral 104 denotes a second fixed lens, and 105 a focus lens which has a function of compensating for movement of a focal plane caused when the magnification is varied and a focusing function. The first fixed lens 101, zoom lens 102, stop 103, second fixed lens 104 and focus lens 105 constitute an image-pickup optical system.

The zoom lens 102 and the focus lens 105 are moved in the optical axis direction (right-left direction in the figure) by a zoom driving actuator 110 and a focus driving actuator 111, respectively.

Light entering the image-pickup apparatus through the image-pickup optical system from an object forms an object image on an image-pickup element 106. The image-pickup element 106 is formed of a photoelectric conversion element such as a CCD sensor or a CMOS sensor and converts the object image into an electric signal. The image-pickup element 106 corresponds to a second detector.

Reference numeral 107 denotes a CDS/AGC circuit which amplifies the electric signal output from the image-pickup element 106 to output it as an image-pickup signal to a camera signal processing circuit 108. The camera signal processing circuit 108 performs predetermined image processes on the input image-pickup signal to generate a video signal suitable for recording at a recording unit 109 and displaying at a monitor 115.

The recording unit 109 records the video signal on an unshown recording medium such as a magnetic tape, an optical disc, or a semiconductor memory. A user can use the monitor 115 as an electronic viewfinder and confirm the recorded video through the monitor 115.

The output from the CDS/AGC circuit 107 is also output to an AF gate 112. The AF gate 112 selects signals within a region used for the later-described AF control from the image-pickup signals of all image-pickup area. The region used for the AF control can be optionally selected, and plural regions used for the AF control can be selected.

The output from the AF gate 112 is input to an AF signal processing circuit 113. The AF signal processing circuit 113 produces an AF evaluation value signal using high-frequency components, luminance difference components (difference components between the maximum and the minimum of the luminance levels) or the like, which are used for the AF control.

The AF evaluation value signal (or an AF evaluation value) represents the sharpness (contrast state) of the video (picked-up image) generated on the basis of the output signals from the image-pickup element 106. Since the sharpness varies with the focus state of the image-pickup optical system, the AF evaluation value signal (AF evaluation value) resultantly represents the focus state of the image-pickup optical system.

Reference numeral 114 denotes a camera/AF microcomputer (hereinafter merely referred to as a microcomputer) which is formed of a CPU and the like, the CPU governing control of the entire image-pickup apparatus. The output from the above-described AF signal processing circuit 113 and the output from an external ranging unit 126, which will be described later, are input to the microcomputer 114 to be used for AF control calculations. The microcomputer 114 controls the focus driving actuator 111 in accordance with the calculation result to move the focus lens 105. The microcomputer 114 acts as a controller and a determining device in this embodiment.

The external ranging unit 126, which is a first detector, measures a distance to an object (object distance) to output a signal corresponding to the object distance. The external ranging unit 126 is a distance sensor unit.

Figure 7:
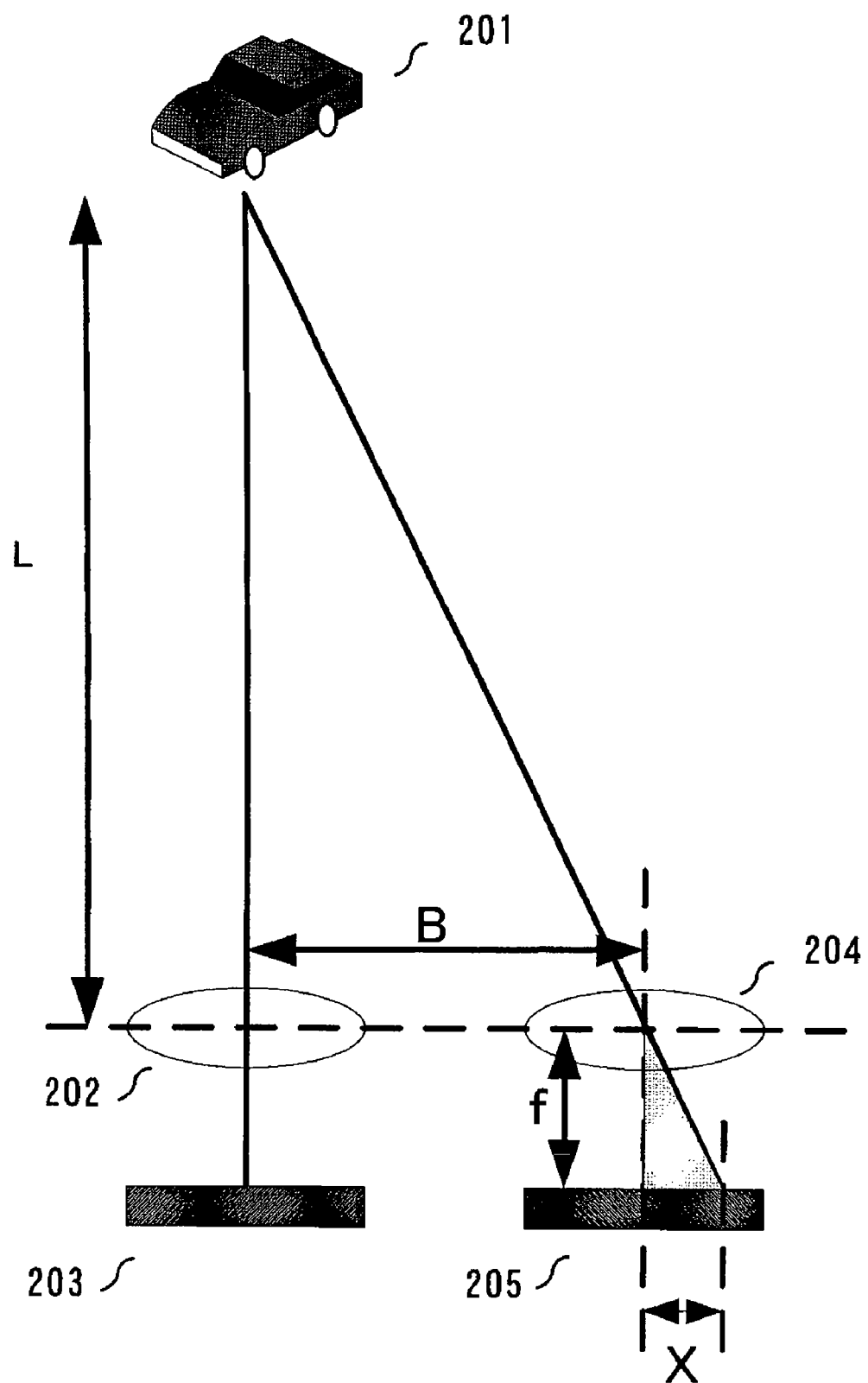
FIG. 7 is a figure showing the principle of a passive phase difference method.
Figure 8:
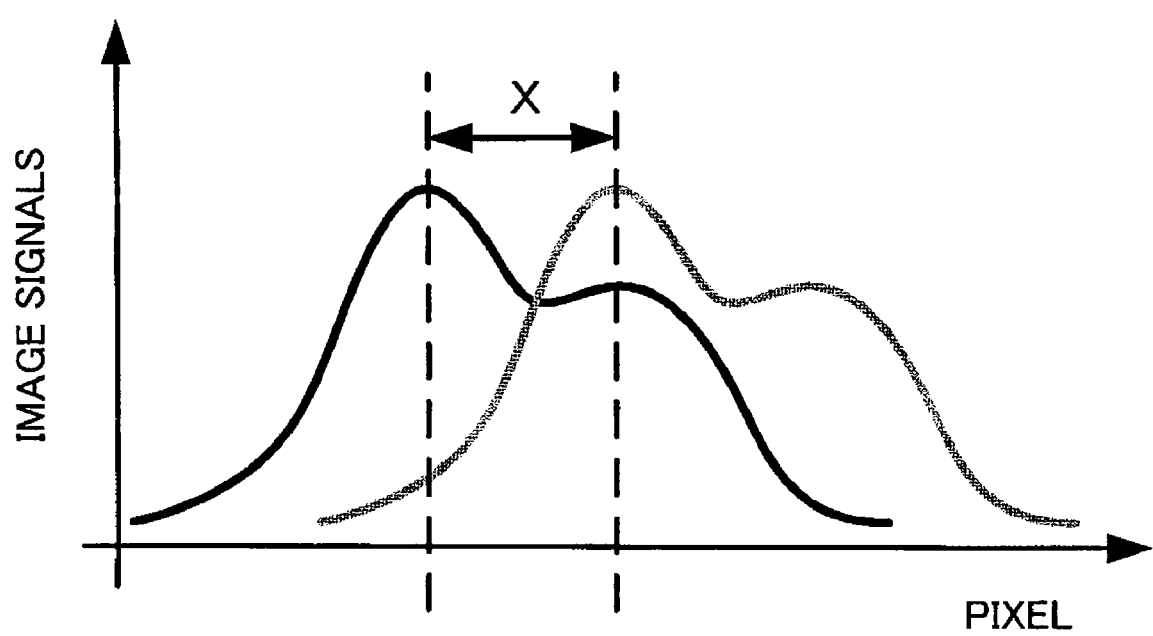
FIG. 8 is a figure showing image signals in the passive phase difference method.

Various types of methods have conventionally been used as ranging methods. FIGS. 7 and 8 show the principle of ranging by a passive phase difference method that is one of the ranging methods.

The external ranging unit 126 is provided independently from the image-pickup optical system. That is, light from an object which does not pass through the image-pickup optical system enters the external ranging unit 126.

In FIG. 7, reference numeral 201 denotes an object, 202 a first image-forming lens, 203 a first light-receiving element array, 204 a second image-forming lens, and 205 a second light-receiving element array. The first and second light-receiving element arrays 203 and 205 are each constituted by plural light-receiving elements (pixels) arranged in a line. The first and second light-receiving element arrays 203 and 205 are spaced apart from each other by a base length B.

A part of light from the object 201, having passed through the first image-forming lens 202, forms an image on the first light-receiving element array 203 while another part of the light, having passed through the second image-forming lens 204, forms an image on the second light-receiving element array 205.

FIG. 8 shows an example of output signals (image signals) from the first and second light-receiving element arrays 203 and 205. Since the first and second light-receiving element arrays 203 and 205 are spaced apart from each other by the base length B, the image signal from the first light-receiving element array 203 and that from the second light-receiving element array 205 are shifted from each other by X pixels.

Accordingly, it is possible to acquire X by calculating the correlation between the two image signals with pixel shifts and determining the amount of the pixel shift (also referred to as the phase difference) at which the correlation value is at the maximum. Using X, the base length B, and a focal length f of the image-forming lenses 202 and 204, a distance L to the object 201 can be calculated on the basis of the principle of triangulation by the following expression (1):

$$L = B \times f / X \qquad (1).$$

Note that, alternative embodiments of the present invention can use ranging methods other than the above-described passive ranging method. The ranging methods other than the passive ranging method include, for example, a method which projects infrared rays and calculates an object distance on the basis of the principle of triangulation and a method which measures a propagation velocity of an ultrasonic wave using an ultrasonic sensor, which are active ranging methods. Alternatively, the microcomputer may calculate an object distance on the basis of X by causing the external ranging unit to output a signal corresponding to the above-described pixel shift amount X.

Further, in this embodiment, the external ranging unit 126 is constituted by arranging plural ranging sensors each of which includes the above-described two image-forming lenses and two light-receiving element arrays. Thus, the external ranging unit 126 includes plural ranging sensors. Using such an external ranging unit 126 enables to perform distance detection with high accuracy in plural regions in the image-pickup area.

Figure 2:
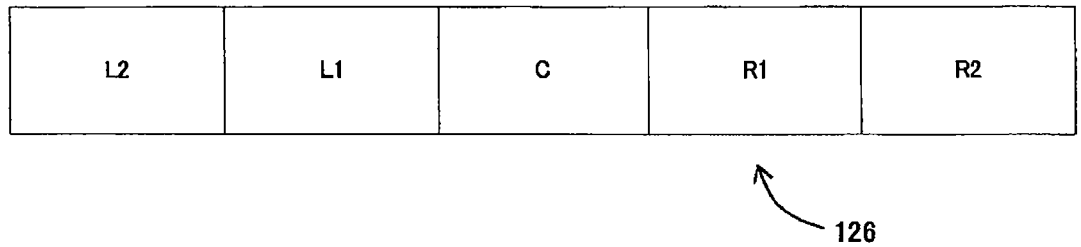
FIG. 2 is a figure showing the arrangement of ranging sensors of an external ranging unit used in the image-pickup apparatus of Embodiment 1.

FIG. 2 shows the external ranging unit 126 used in this embodiment. The external ranging unit 126 includes five ranging sensors L2, L1, C, R1 and R2. The five ranging sensors (light-receiving sensors) have the same configuration.

Each ranging sensor can be arranged such that the optical axes of the image-forming lenses are parallel to the optical axis of the image-pickup optical system. Alternatively, each ranging sensor can be arranged such that the optical axes of the image-forming lenses intersect with the optical axis of the image-pickup optical system at a certain distance in order to correct a parallax between the image-pickup area of the image-pickup optical system and an image-obtaining area (view field) of the external ranging unit 126.

In the passive ranging method which is influenced by contrast, the accuracy in ranging of an object with a low contrast is reduced. Therefore, each ranging sensor of the external ranging unit 126 is equipped with a function of outputting a detection error signal as a predetermined signal when the correlation calculation with the pixel shifts cannot be performed in each ranging sensor, that is, when the object distance cannot be measured.

Figure 4:
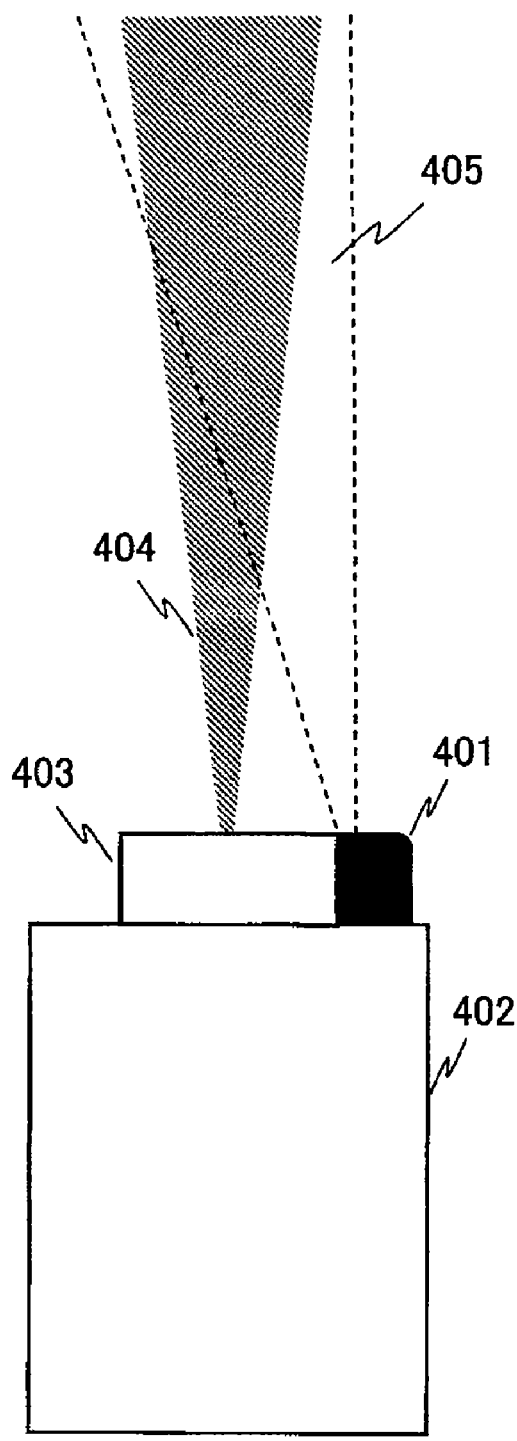
FIG. 4 is a top view of the image-pickup apparatus of Embodiment 1.

FIG. 4 shows a top view of the image-pickup apparatus. Reference numeral 403 denotes a lens barrel part accommodating the image-pickup optical system. Reference numeral 401 denotes the external ranging unit corresponding to the above-described external ranging unit 126, and 402 a main body of the image-pickup apparatus. Reference numeral 405 denotes an image-obtaining area of the external ranging unit 401, that is, an area in which the object distance can be measured. Reference numeral 404 denotes an image-pickup area of the image-pickup optical system where the AF evaluation value signal can be produced.

Figure 5:
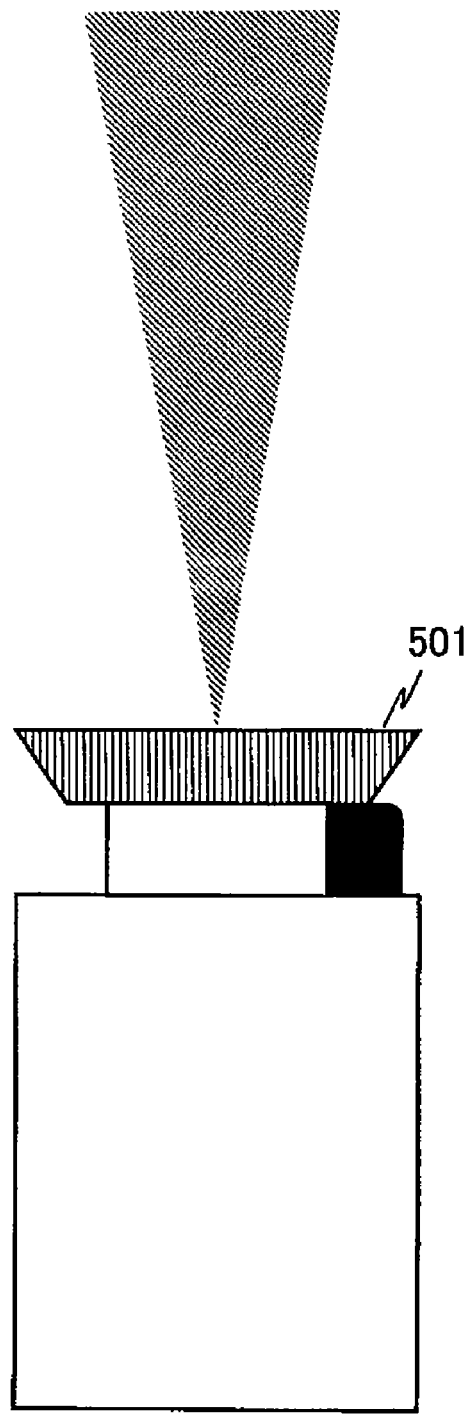
FIG. 5 is a top view of the image-pickup apparatus of Embodiment 1 onto which the conversion lens is attached.

FIG. 5 shows an appearance of the image-pickup apparatus shown in FIG. 4 onto which a conversion lens as an accessory device is attached. Reference numeral 501 denotes the conversion lens such as a telephoto conversion lens and a wide-angle conversion lens.

Figure 3:
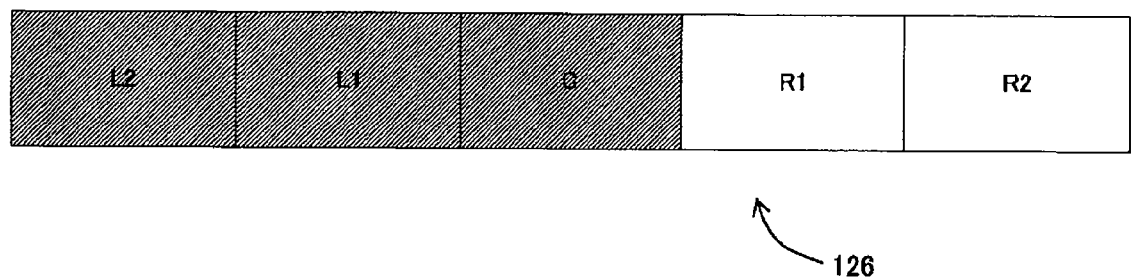
FIG. 3 is a figure showing a state of the ranging sensors of the external ranging unit when a conversion lens is attached in Embodiment 1.

As shown in FIG. 5, the conversion lens 501 attached onto the image-pickup apparatus covers (blocks) with its exterior member at least part of the external ranging unit 401. FIG. 3 shows, by hatching, a state in which the ranging sensors L2, L1 and C of the external ranging unit 401 are covered by the conversion lens 501 and thereby light from an object does not enter thereinto.

Note that although description herein is made of a case where part of the ranging sensors is covered by the conversion lens, all of the ranging sensors may be covered by the conversion lens.

In the state in which the ranging sensors L2, L1 and C are covered by the conversion lens 501 as shown in FIG. 3, images cannot be detected by these covered ranging sensors or the contrast of each detected image is reduced even if the detection by the covered ranging sensors can be made. In such a case, the above-described correlation calculation with the pixel shifts cannot be performed. Consequently, each of the three ranging sensors L2, L1 and C outputs the detection error signal.

Figure 6:
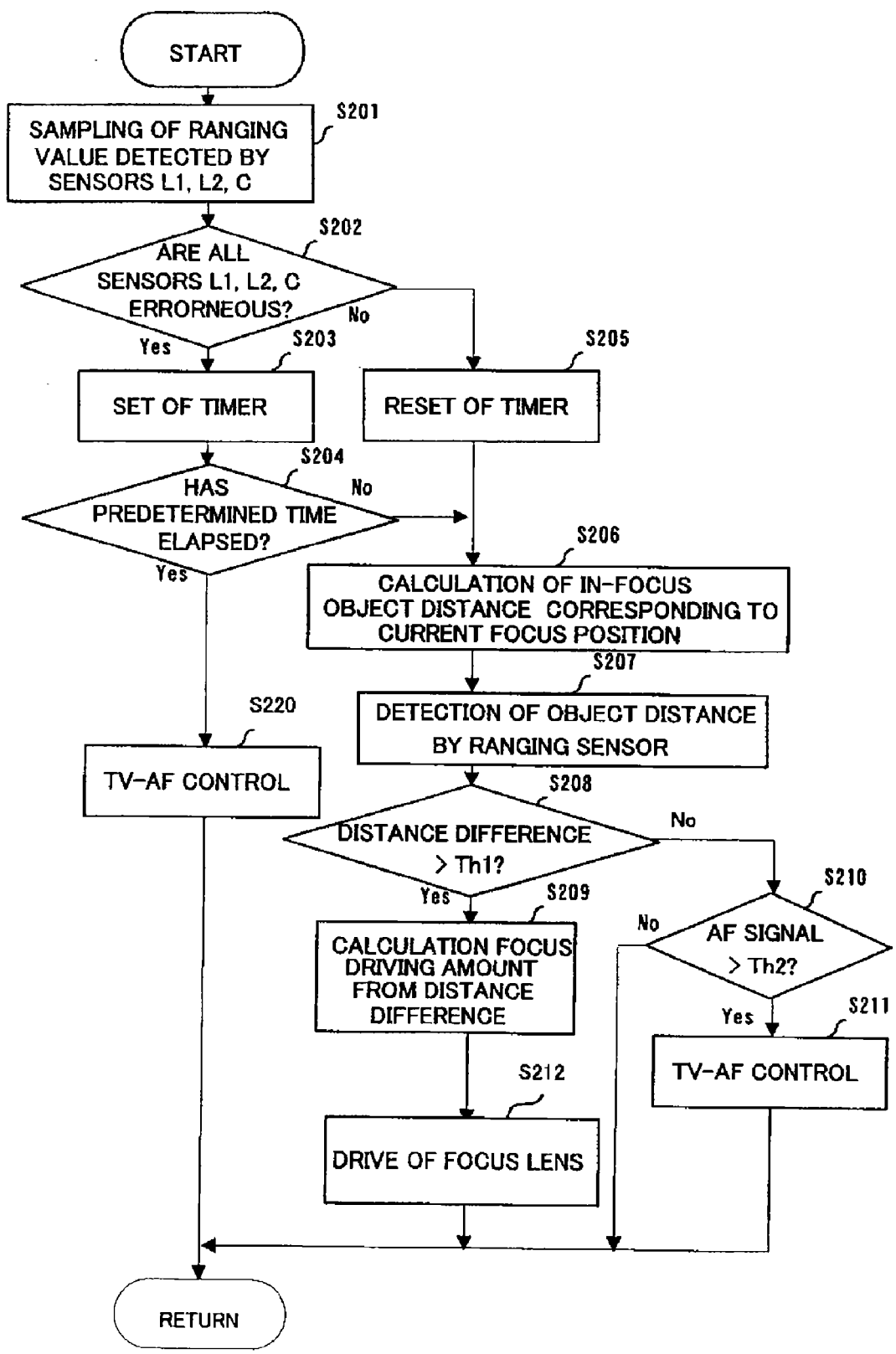
FIG. 6 is a flowchart showing an AF control procedure in the image-pickup apparatus of Embodiment 1.

FIG. 6 shows the procedure of the AF control performed by the microcomputer 114. This AF control is performed according to a computer program stored in the microcomputer 114.

The microcomputer 114 first samples ranging amounts (distance signals) that are acquired from the ranging sensors L2, L1 and C shown in FIG. 3 at step S201. Next, the microcomputer 114 determines whether or not at least one of the ranging sensors L2, L1 and C outputs the detection error signal at step S202. If at least one of the ranging sensors L2, L1 and C does not output the detection error signal, the process proceeds to step S205.

On the other hand, if all of the ranging sensors L2, L1 and C output the detection error signals, the process proceeds to step S203.

At step S203, the microcomputer 114 set a timer and causes it to start counting for a predetermined time. Although not shown in FIG. 6, the timer counts only the predetermined time without exceeding it.

Next, at step S204, the microcomputer 114 determines whether or not the predetermined time has elapsed. If the predetermined time has not elapsed, the process proceeds to step S206. If the predetermined time has elapsed, the microcomputer 114 regards a conversion lens as being attached onto the image-pickup apparatus, and thereby the process proceeds to step S220. Thus, at steps S202 and S204, the microcomputer 114 determines that the conversion lens is attached onto the image-pickup apparatus on the basis of the detection error signals from the external ranging unit 126 (401) (ranging sensors L2, L1 and C).

At step S220, the microcomputer 114 controls the focus driving actuator 111 using only the TV-AF method to move the focus lens 105 so as to search for an in-focus position. The AF control using the TV-AF method is well-known, so that description thereof will be omitted.

When the AF control using the TV-AF method is completed, the process returns to step S201.

When the process proceeds to step S205 on the basis of a determination that at least one of the ranging sensors L2, L1 and C does not output the detection error signal at step S202, the microcomputer 114 resets the timer, and then the process proceeds to step S206.

At step S206, the microcomputer 114 calculates an object distance at which an in-focus state can be obtained for the current position of the focus lens 105.

Next, at step 207, the microcomputer 114 detects the object distance based on the distance signal from the external ranging unit 126 (401) (ranging sensors L2, L1, C, R1 and R2).

Then, at step S208, the microcomputer 114 compares the object distance calculated at step S206 and that detected at step S207 to determine whether or not the difference therebetween is larger than a predetermined threshold value Th1. If the difference is larger than the threshold value Th1, the image-pickup optical system is greatly out of focus with respect to an object existing at the object distance detected at step S207, so that the process proceeds to step S209 where the microcomputer 114 calculates a movement amount corresponding to the above-described difference of the object distances.

Then, at step S212, the microcomputer 114 moves the focus lens 105 such that an in-focus state can be achieved for the object distance calculated on the basis of the distance signal from the external ranging unit 126 (401), and then the process returns to step S201.

On the other hand, at step S208, when the difference of the object distances is smaller than the threshold value Th1, the focus lens 105 is located substantially at an in-focus position, so that the microcomputer 114 starts fine focus adjustment using the TV-AF method with higher focusing accuracy.

At step S210, the microcomputer 114 first determines whether or not the AF evaluation value is higher than a predetermined threshold value Th2. If it is larger, the process proceeds to step S211 where the microcomputer 114 performs the AF control using the TV-AF method. Thus, an in-focus state can finally be obtained with high accuracy. Then, the process returns to the step S201.

If the AF evaluation value is lower than the threshold value Th2 at step S210, an accurate in-focus state may not be obtained due to noise components or the like included in the AF evaluation value, so that the microcomputer 114 do not perform the AF control any more. Then, the process returns to step S201.

As described above, the present embodiment can determine that the conversion lens is attached onto the image-pickup apparatus on the basis of the signal (detection error signal) output from the external ranging unit 126 (401) which is used for the AF control. This enables the determination of an attachment of the conversion lens without a detector for detecting the attachment of the conversion lens such as a switch, and a setting operation by a user. Further, the present embodiment performs the AF control by the TV-AF method without using the external ranging unit 126 when the attachment of the conversion lens is detected, thereby preventing malfunction of the AF control.

Embodiment 2

Description will hereinafter be made of an image-pickup apparatus which is Embodiment 2 of the present invention. The configuration thereof is similar to that of Embodiment 1, so that components identical to those in Embodiment 1 are designated with the same reference numerals as those in Embodiment 1, and descriptions thereof are omitted.

Figure 10:
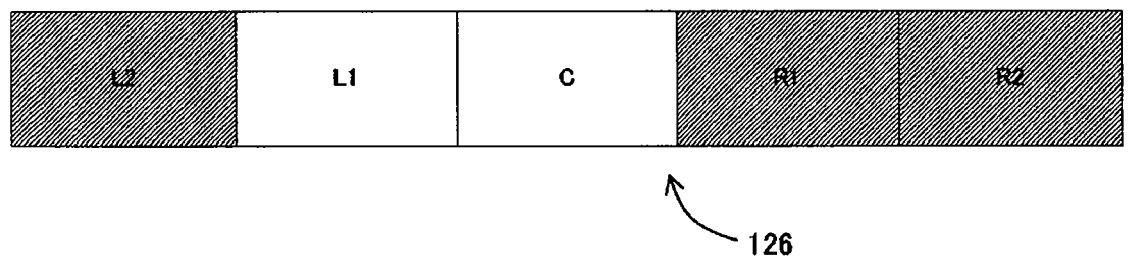
FIG. 10 is a figure showing a state of ranging sensors of an external ranging unit when a first conversion lens is attached in Embodiment 2.

In this embodiment, as shown in FIG. 10 by hatching, the ranging sensors L2, R1 and R2 of the external ranging unit 126 are covered (blocked) with an exterior member of a first conversion lens which is attached onto the image-pickup apparatus and has a conversion magnification of α.

Figure 11:
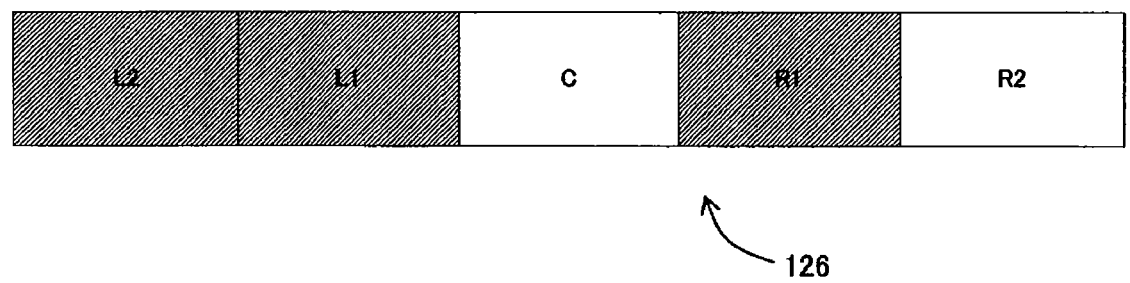
FIG. 11 is a figure showing a state of the ranging sensors of the external ranging unit when a second conversion lens is attached in Embodiment 2.

Further, as shown in FIG. 11 by hatching, the ranging sensors L2, L1 and R1 of the external ranging unit 126 are covered (blocked) with an exterior member of a second conversion lens which is attached onto the image-pickup apparatus and has a conversion magnification of β(≠α). That is, conversion lenses including the first and second conversion lenses are different in conversion magnifications and shapes of the exterior members (in particular, shapes of parts covering the external ranging unit 126) in each type (model).

In this case, each ranging sensor covered by the conversion lens outputs the detection error signal, so that the first and second conversion lenses can be distinguished depending on a combination of the ranging sensors outputting the detection error signals. In other words, the microcomputer 114 can distinguish the attached conversion lens depending on which one or more of the plural ranging sensors outputs the detection error signal.

The exterior members of the first and second conversion lenses have a shape enabling ranging (distance measurement) by at least one of the ranging sensors. In this embodiment, description will be made of a case where the exterior members of the first and second conversion lenses have a shape enabling ranging by the ranging sensor C.

A predetermined calculation using a distance L measured by the ranging sensor C and the conversion magnification of the attached conversion lens makes it possible to obtain an actual object distance.

In this embodiment, description will be made of a case where two types of conversion lenses are attached to the image-pickup apparatus. However, giving different shapes to the exterior members of more types of conversion lenses makes it possible to distinguish a lot of types of conversion lenses and to measure the object distance for each conversion lens.

Figure 9:
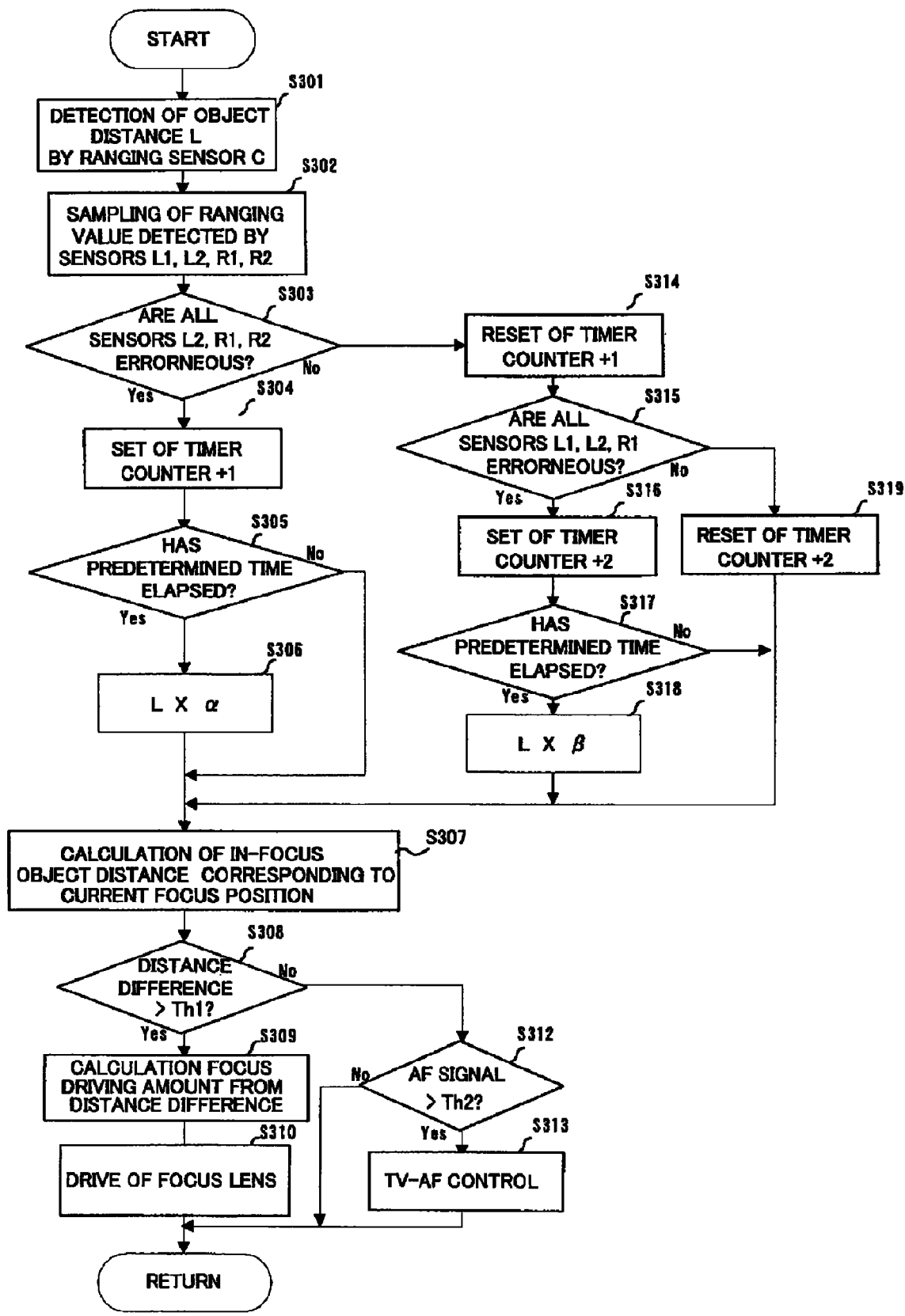
FIG. 9 is a flowchart showing an AF control procedure in an image-pickup apparatus that is Embodiment 2 of the present invention.

FIG. 9 shows the procedure of the AF control performed by the microcomputer 114. This AF control is also performed according to a computer program stored in the microcomputer 114. The microcomputer 114 acts as a controller and a distinguishing device in this embodiment.

The microcomputer 114 first detects a distance L to an object by the ranging sensor C at step S301. Next, at step S302, the microcomputer 114 samples the outputs from the ranging sensors L2, L1, R1 and R2 to store them in a buffer memory provided in the microcomputer 114.

Next, at step S303, the microcomputer 114 determines whether or not all of the ranging sensors L2, R1 and R2 output the detection error signals. If at least one of the ranging sensors L2, R1 and R2 does not output the detection error signal, the process proceeds to step S314.

On the other hand, if all of the ranging sensors L2, R1 and R2 output the detection error signals as shown in FIG. 10, the process proceeds to step S304. At step S304, the microcomputer 114 sets a timer and causes it to start counting a predetermined time t1. Although not shown in FIG. 9, the timer counts only the predetermined time t1 without exceeding it.

Next, at step S305, the microcomputer 114 determines whether or not the predetermined time t1 has elapsed. If the predetermined time t1 has not elapsed, the process proceeds to step S307. If the predetermined time t1 has elapsed, the microcomputer 114 regards the first conversion lens as being attached onto the image-pickup apparatus, and thereby the process proceeds to step S306. Thus, at steps S303 and S305, the microcomputer 114 distinguishes that the conversion lens attached onto the image-pickup apparatus is the first conversion lens on the basis of the detection error signals from the external ranging unit 126 (ranging sensors L2, R1 and R2).

At step S306, the microcomputer 114 multiplies the object distance detected at step S301 by the conversion magnification a of the first conversion lens, and sets the resulting value as the final object distance when the first conversion lens is attached onto the image-pickup apparatus.

When the process proceeds to step S314 on the basis of a determination that at least one of the ranging sensors L2, R1 and R2 does not output the detection error signal at step S303, the microcomputer 114 resets the timer (t1), and then the process proceeds to step S315.

At step S315, the microcomputer 114 determines whether or not all of the ranging sensors L2, L1 and R1 output the detection error signals. If at least one of the ranging sensors L2, L1 and R1 does not output the detection error signal, the process proceeds to step S319.

On the other hand, if all of the ranging sensors L2, L1 and R1 output the detection error signals as shown in FIG. 11, the process proceeds to step S316. At step S316, the microcomputer 114 sets a timer and causes it to start counting a predetermined time t2. Although not shown in FIG. 9, the timer counts only the predetermined time t2 without exceeding it.

Next, at step S317, the microcomputer 114 determines whether or not the predetermined time t2 has elapsed. If the predetermined time t2 has not elapsed, the process proceeds to step S307. If the predetermined time t2 has elapsed, the microcomputer 114 regards the second conversion lens as being attached onto the image-pickup apparatus, and thereby the process proceeds to step S318. Thus, at steps S315 and S317, the microcomputer 114 distinguishes that the conversion lens attached onto the image-pickup apparatus is the second conversion lens on the basis of the detection error signals from the external ranging unit 126 (ranging sensors L2, L1 and R1).

At step S318, the microcomputer 114 multiplies the object distance detected at step S301 by the conversion magnification β of the second conversion lens, and sets the resulting value as the final object distance when the second conversion lens is attached onto the image-pickup apparatus.

When the process proceeds to step S319 on the basis of a determination that at least one of the ranging sensors L2, L1 and R1 does not output the detection error signal at step S315, the microcomputer 114 resets the timer (t2), and then the process proceeds to step S307.

At step S307, the microcomputer 114 calculates an object distance at which an in-focus state can be obtained for the current position of the focus lens 105.

Then, at step S308, the microcomputer 114 compares the object distance calculated at step S307 and that calculated at step S306 or S318 in accordance with the conversion magnification to determine whether or not the difference therebetween is larger than a predetermined threshold value Th1. If the difference is larger than the threshold value Th1, the image-pickup optical system is greatly out of focus with respect to an object existing at the object distance calculated at step S306 or S318, so that the process proceeds to step S309 where the microcomputer 114 calculates a movement amount corresponding to the above-described difference of the object distances.

Then, at step S310, the microcomputer 114 moves the focus lens 105 such that an in-focus state can be achieved for the object distance calculated at step S306 or S318, that is, calculated on the basis of the distance signal from the external ranging unit 126, and then the process returns to step S301.

On the other hand, at step S308, when the difference of the object distances is smaller than the threshold value Th1, the focus lens 105 is located substantially at an in-focus position, so that the microcomputer 114 starts fine focus adjustment using the TV-AF method with higher focusing accuracy.

At step S312, the microcomputer 114 first determines whether or not the AF evaluation value is higher than a predetermined threshold value Th2. If it is larger, the process proceeds to step S313 where the microcomputer 114 performs the AF control using the TV-AF method. Thus, an in-focus state can finally be obtained with high accuracy. Then, the process returns to the step S301.

If the AF evaluation value is lower than the threshold value Th2 at step S312, an accurate in-focus state may not be obtained due to noise components or the like included in the AF evaluation value, so that the microcomputer 114 do not perform the AF control any more. Then, the process returns to step S301.

As described above, the present embodiment can distinguish the conversion lens attached onto the image-pickup apparatus on the basis of the signal (detection error signal) output from the external ranging unit 126 which is used for the AF control. This enables the distinction of the attached conversion lens without a detector for detecting the type of the attached conversion lens such as a switch, and a setting operation by a user. This enables an AF control suitable for the attached conversion lens.

As described above, according to each of the embodiments, the determination of the attachment of the accessory device or the distinction of the attached accessory device can be performed on the basis of a predetermined signal output from the first detector that is used for a focus control. This enables to perform the above determination or distinction without a detector for detecting the attachment or type of the accessory device such as a switch, and a setting operation by a user. Therefore, malfunction of the focus control due to the attachment of the accessory device can be prevented, and further a focus control suitable for the attached accessory device can be performed.

Furthermore, embodiments of the present invention are not limited to the above preferred embodiments, that is, various variations and modifications may be made without departing from the scope of the present invention.

For example, although a description in each of the above embodiments was made of a case where the conversion lens as an accessory device is attached onto the image-pickup apparatus, alternative embodiments of the present invention include image-pickup apparatuses onto which accessory devices other than the conversion lens can be attached.

Further, a description in each of the above embodiments was made of a case where the determination of the attachment of the accessory device or the distinction of the attached accessory device is performed on the basis of the detection error signal from the external ranging unit. However, alternative embodiments of the present invention can perform the determination of the attachment of the accessory device or the distinction of the attached accessory device on the basis of a signal showing an extremely short distance from an external ranging unit.

Moreover, a description in each of the above embodiments was made of the image-pickup apparatus employing the hybrid AF method. However, alternative embodiments of the present invention include image-pickup apparatuses equipped with a detector which performs a detection for a focus control using light from an object which does not pass through an image-pickup optical system.

This application claims foreign priority benefits based on Japanese Patent Application No. 2006-201997, filed on Jul. 25, 2006, which is hereby incorporated by reference herein in its entirety as if fully set forth herein.

What is claimed is:

1. An image-pickup apparatus onto which accessory devices are detachably attached, comprising:
    a first detector which receives light from an object which does not pass through an image-pickup optical system to output a signal corresponding to an object distance, the first detector including a plurality of sensors which output a predetermined signal; and
    a distinguishing device which distinguishes the accessory device attached onto the image-pickup apparatus on the basis of the predetermined signal output from the first detector,
    wherein the distinguishing device distinguishes the accessory device attached onto the image-pickup apparatus on the basis that a combination of sensors which output the predetermined signal is different with respect to each accessory device attached on to the image-pickup apparatus.

2. An image-pickup apparatus according to claim 1, further comprising a controller which performs a focus control using the signal corresponding to the object distance,
    wherein the controller performs the focus control in accordance with the distinguished result by the distinguishing device.

3. An image-pickup apparatus according to claim 1, wherein
the controller calculates the object distance in accordance with the signal from the first detector and the distinguished result by the distinguishing device.

4. An image-pickup apparatus according to claim 1, further comprising:
a second detector which generates a second signal corresponding to a contrast state of a picked-up image;
a controller which performs a focus control based on the signals from the first and second detectors.

5. An image-pickup apparatus according to claim 1, wherein the accessory device is a conversion lens.

6. A method of distinguishing an attached accessory device for an image-pickup apparatus onto which accessory devices are detachably attached, comprising the steps of:

activating a first detector which receives light from an object which does not pass through an image-pickup optical system to output a signal corresponding to an object distance, the first detector including a plurality of sensors which output a predetermined signal; and distinguishing the accessory device attached onto the image-pickup apparatus on the basis of the predetermined signal output from the first detector, wherein the distinguishing step distinguishes the accessory device attached onto the image-pickup apparatus on the basis that a combination of sensors which output the predetermined signal is different with respect to each accessory device attached onto the image-pickup apparatus.

* * * * *